US008682181B2

(12) United States Patent
Liu et al.

(10) Patent No.: US 8,682,181 B2
(45) Date of Patent: Mar. 25, 2014

(54) SYSTEM, METHOD, AND APPARATUS FOR HIGH-SENSITIVITY OPTICAL DETECTION

(75) Inventors: Xiang Liu, Marlboro, NJ (US); Thomas Huntington Wood, Holmdel, NJ (US); Robert William Tkach, Little Silver, NJ (US)

(73) Assignees: Alcatel Lucent, Paris (FR); LGS Innovations LLC, Vienna, VA (US)

( * ) Notice: Subject to any disclaimer, the term of this patent is extended or adjusted under 35 U.S.C. 154(b) by 269 days.

(21) Appl. No.: 13/041,386

(22) Filed: Mar. 5, 2011

(65) Prior Publication Data

US 2012/0224862 A1    Sep. 6, 2012

(51) Int. Cl.
*H04B 10/06* (2011.01)
(52) U.S. Cl.
USPC ........... 398/205; 398/152; 398/189; 398/203; 398/204; 375/239
(58) Field of Classification Search
USPC ........... 398/81, 158, 202–204, 208, 209, 189, 398/190, 191, 205, 152; 375/229, 376, 239, 375/325, 324, 340, 242, 256, 260
See application file for complete search history.

(56) References Cited

U.S. PATENT DOCUMENTS

| 7,315,575 | B2* | 1/2008 | Sun et al. | 375/229 |
|---|---|---|---|---|
| 8,081,882 | B2* | 12/2011 | Tuchler | 398/189 |
| 8,233,579 | B2* | 7/2012 | Badaroglu | 375/376 |
| 8,358,939 | B2* | 1/2013 | Komaki | 398/202 |
| 2004/0170439 | A1* | 9/2004 | Hiironen | 398/190 |
| 2012/0177385 | A1* | 7/2012 | Guha | 398/202 |

* cited by examiner

*Primary Examiner* — M. R. Sedighian
(74) *Attorney, Agent, or Firm* — A. Ralston

(57) ABSTRACT

An apparatus receives data encoded in a format where information bits for transmission are mapped into symbols each carrying a plurality of bits, some being encoded through a pulse position modulation (PPM) format and some being encoded through an additional modulation format on at least one PPM pulse. A receiver detects the signal through a dual-polarization coherent receiver front-end, recovering polarization components of the signal by decoding a first non-zero portion of a plurality of bits carried by a symbol based on slot position of at least one PPM pulse in the polarization components and a second non-zero portion of the plurality of bits carried by the symbol based on the additional modulation carried by at least one PPM pulse in the polarization components. Pilot-assisted single-carrier frequency-division equalization (PA-SC-FDE) may be used for reliable signal reception in the presence of severe PPM errors.

20 Claims, 9 Drawing Sheets

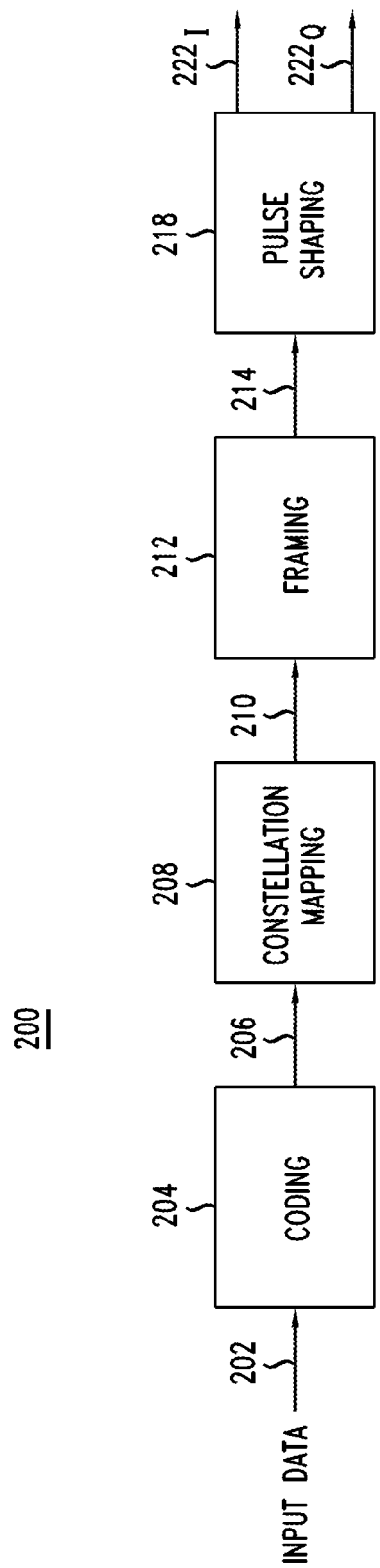

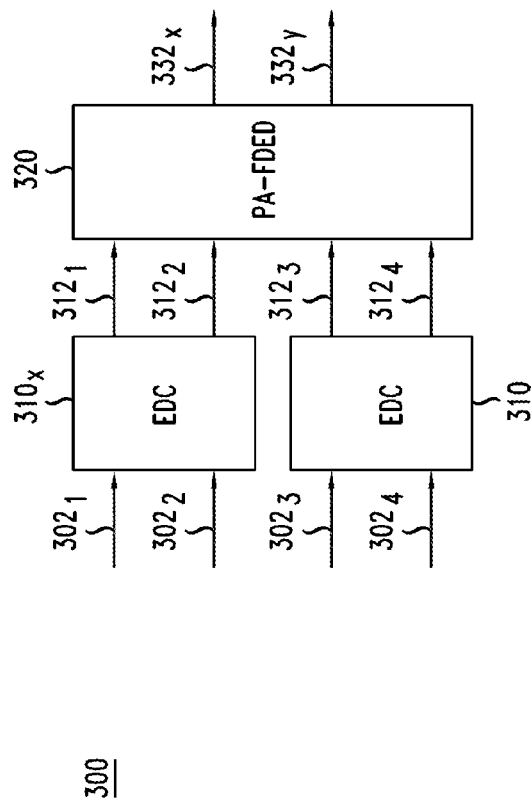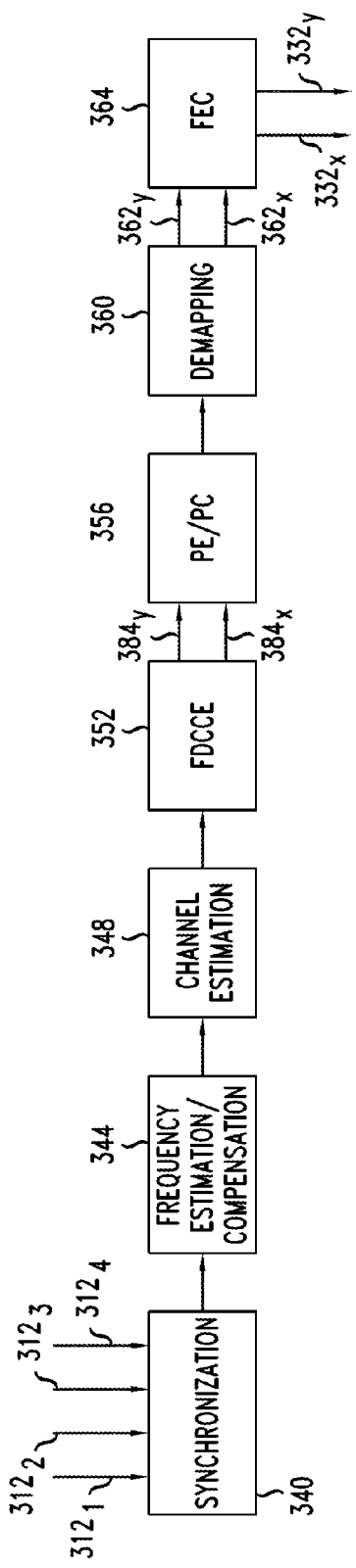

TRANSMITTER DSP

| |
|---|
| MAP INPUT BITS FOR PQ-mPPM INTO GROUPS WITH LOG (m)+4 BITS PER SYMBOL |
| ENCODE THE FIRST LOG2(m) BITS OF EACH SYMBOL THROUGH m-PPM |
| ENCODE THE REMAINING 4 BITS OF EACH SYMBOL THROUGH PDM-QPSK ON THE PPM PULSE |
| REPEAT THE ABOVE TO FORM A FRAME OF PQ-mPPM SYMBOLS |
| DISTRIBUTE A SET OF PILOT-SYMBOLS INSIDE THE FRAME (FOR PHASE ESTIMATION); |
| INSET PILOT-SEQUENCES AT THE BEGINNING OF THE FRAME (FOR SYNCHRONIZATION AND CHANNEL ESTIMATION) |
| REPEAT THE ABOVE FOR THE NEXT FRAME |

710, 720, 730, 740, 750, 760, 770

SYSTEM, METHOD, AND APPARATUS FOR HIGH-SENSITIVITY OPTICAL DETECTION

CROSS-REFERENCE TO RELATED APPLICATIONS

The subject matter of this application is related to that of U.S. patent application Ser. No. 13/041,384, filed Mar. 5, 2011, which application is incorporated herein by reference in its entirety.

BACKGROUND

1. Field of the Invention

The present invention relates to optical communication equipment and, more specifically but not exclusively, to optical modulation and detection in coherent optical transmission systems.

2. Description of the Related Art

This section introduces aspects that may help facilitate a better understanding. Accordingly, the statements of this section are to be read in this light and are not to be understood as admissions about what is in the prior art or what is not in the prior art.

There is a continued quest to improve receiver sensitivity in optical communication systems, particularly for free-space optical communications. Improving receiver sensitivity or reducing the required signal photons per bit (ppb) directly leads to improved transmission link performance. Receiver sensitivity is determined primarily by the modulation format and detection scheme utilized. m-ary pulse-position-modulation (m-PPM) is a well-established modulation format for achieving high receiver sensitivity. The variable m, the size of the alphabet, is usually a power of two so that each symbol represents $\log_2 m$ bits.

When used with ideal photon-counting receivers, m-PPM is capable of approaching the Shannon limit with the increase of m. However, photon-counting receivers currently have limited bandwidth and are not suitable for high-speed (>1 Gb/s) optical transmission. When used with optical amplified receivers, the theoretical sensitivity of m-PPM becomes lower than when an ideal photon-counting receiver is utilized. In addition, the use of large m in m-PPM reduces the channel data rate for a given (slot) modulation speed. Recently, direct-detection binary differential phase-shift keying (DPSK) and coherent-detection binary phase-shift keying (BPSK) have been used to achieve high-sensitivity and high-data-rate communication, but their sensitivities are not as high as those achieved with high-level m-PPM.

SUMMARY

Disclosed herein are various embodiments for optical modulation and detection with high sensitivity. According to various embodiments, information bits are encoded through the positioning of the pulses in a PPM format and through at least one of polarization, amplitude and phase states of these pulses or a combination of these states for these pulses. According to other embodiments, a signal is coherently detected and the information bits contained therein retrieved by first finding the position of at least one PPM pulse and then decoding the additional modulation carried by these pulses.

In one embodiment, the additional modulation of the pulse/s is through polarization-division-multiplexed quadrature-phase-shift keying (PDM-QPSK), and the new format is hereafter referred to as PQ-mPPM (Polarization-division-multiplexed Quadrature-phase-shift-keyed m-ary-Pulse-Position-Modulation). The coherent detection of the PQ-mPPM signal may be based on pilot-assisted single-carrier frequency-division equalization (PA-SC-FDE) for reliable signal reception even in the presence of severe PPM errors. The unique combined use of PDM-QPSK and PPM provided herein produces much higher receiver sensitivity than either PPM or PDM-QPSK alone. It also offers much higher sensitivity than simply combining PPM with DPSK, BPSK or QPSK.

According to one embodiment, a first non-zero portion of a plurality of bits for a symbol is encoded through at least one slot position corresponding to a pulse position modulation (PPM) format, a second non-zero portion of the plurality of bits for the symbol is encoded on the at least one slot position through an additional modulation format, and a signal including the symbol onto an optical carrier by an optical modulation means.

According to another embodiment, a first non-zero portion of a plurality of bits for a symbol is encoded through at least one slot position corresponding to a pulse position modulation (PPM) format, a second non-zero portion of the plurality of bits for the symbol is encoded through an additional modulation format (e.g., a polarization-division-multiplexed phase-modulated modulation format) for a pulse for the at least one slot position, and a signal including the symbol is modulated onto an optical carrier through a dual-polarization optical modulator.

In one embodiment, the example method includes grouping a stream of data bits into the plurality of bits for the symbol, the symbol carrying $\log_2(m)+4$ bits with a first $\log_2(m)$ bits of the plurality of bits (i.e., first non-zero portion) encoded via the slot position corresponding to a pulse for a m-ary pulse position modulation (m-PPM) format and a remaining four (4) bits of the plurality of bits (i.e., second non-zero portion) encoded via a polarization-division-multiplexed quadrature phase-shift keying (PDM-QPSK) format for a pulse for the slot position. Two polarizations may be encoded for each symbol, each carrying respective sub-portions of the second non-zero portion of the plurality of bits. A symbol may include a plurality of pulses positioned at corresponding slot positions. Further, a symbol may have m slot positions, m being an integer value with $2 \leq m \leq 16$.

The additional modulation format may be at least one of a polarization-division-multiplexed (PDM) format, a phase-shift keying (PSK) format, a polarization shift keying (PolSK) modulation format, an amplitude modulation (AM) format, a quadrature amplitude modulation (QAM) format, or a combination thereof. For example, the additional modulation format may be at least one of polarization-division-multiplexed quadrature phase-shift keying (PDM-QPSK), polarization-division-multiplexed binary phase-shift keying (PDM-BPSK), PDM-3PSK, or polarization-division-multiplexed m-ary phase-shift keying (PDM-mPSK) with m>4. In addition to the phase modulation, it is understood that the definition of a polarization-division multiplexed phase-modulated modulation format includes formats where the amplitude of each PPM pulse may be modulated, e.g., through polarization-division-multiplexed n-point quadrature-amplitude modulation (PDM-nQAM) with n>4.

In one embodiment, the signal includes a plurality of symbols, and a plurality of pilot-sequences for facilitating at least one of time synchronization, frequency synchronization and channel estimation. In another embodiment, the signal includes a plurality of symbols, and a plurality of pilot symbols for facilitating phase estimation. In yet another embodiment, the method includes converting an encoded signal including the symbol into a drive signal for modulation by the optical modulation means.

In one embodiment, an example apparatus includes a memory; a processor associated with the memory, the processor configured to encode a first non-zero portion of a plurality of bits for a symbol through at least one slot position corresponding to a pulse position modulation (PPM) format and encode a second non-zero portion of the plurality of bits for the symbol through an additional modulation format for a pulse for the at least one slot position; and an optical modulation means for modulating a signal including the symbol onto an optical carrier.

The processor can be adapted to group a stream of data bits into the plurality of bits for the symbol, the symbol carrying $\log_2(m)+4$ bits, encode a first $\log_2(m)$ bits of the plurality of bits via the slot position corresponding to a pulse for a m-ary pulse position modulation (m-PPM) format, and encode a remaining four (4) bits of the plurality of bits via an additional modulation format (e.g., a polarization-division-multiplexed quadrature phase-shift keying (PDM-QPSK) format) for a pulse for the first slot position.

In one embodiment, the processor is configured to encode pulses at more than one slot position for the symbol. The processor may be configured to encode polarizations of a pulse with a respective sub-portion of the second non-zero portion of the plurality of bits. In one embodiment, the processor is adapted to generate a frame for the signal for modulation by the optical modulation means, the frame including a plurality of symbols and a plurality of pilot-sequences. In another embodiment, the processor is adapted to generate a frame for the signal for modulation, the frame including a plurality of symbols and a plurality of pilot symbols. The optical modulation means may include at least one of a polarization-diversity I/Q modulator, a dual polarization optical modulator, a phase modulator, an intensity modulator, a Mach Zehnder modulator, a current modulated laser. The optical modulation means may be an array of one or more of the above described modulator or lasers. In one embodiment, the apparatus includes a plurality of digital-to-analog converters (DACs) for converting an encoded signal including the symbol into a drive signal, which is the signal for modulation by the optical modulation means.

According to one embodiment, a signal including a symbol with at least one pulse position modulation (PPM) pulse having additional modulation is detected through a dual-polarization coherent receiver front-end; and polarization components of the detected signal are recovered. The recovering includes decoding a first non-zero portion of a plurality of bits carried by a symbol based on slot position of the at least one PPM pulse having additional modulation in the polarization components, and decoding a second non-zero portion of the plurality of bits carried by the symbol based on the additional modulation carried by the at least one PPM pulse in the polarization components.

According to one embodiment, the detected signal is polarization-division multiplexed pulse position modulation (PDM PPM) signal and the recovering includes decoding a first non-zero portion of a plurality of bits carried by a symbol based on at least one slot position of a first PPM pulse in the polarization components, and decoding a second non-zero portion of the plurality of bits carried by the symbol based on at least a phase-modulation carried by the at least one PPM pulse in the polarization components.

In one embodiment, the PPM symbol includes PPM pulses having additional modulation in the digital polarization components of a plurality of slot positions, and the method includes decoding the first non-zero portion based on the plurality of slot positions having the PPM pulses and decoding the second non-zero portion based on the additional modulation of the PPM pulses for the respective slot positions. The symbol has m slot positions where $2 \leq m \leq 16$ in one embodiment.

In one embodiment, recovering the polarization components is assisted by one or more pilot-sequences. In one embodiment, the detected signal comprises a frame including a group of one or more pilot-sequences and a plurality of PPM symbols with at least one PPM pulse having additional modulation. Time synchronization, frequency synchronization, or channel estimation may be performed based on the one or more pilot-sequences carried by the detected signal.

In one embodiment, recovering the polarization components of the detected signal is assisted by at least one pilot-symbol. Recovering may include performing phase estimation or frequency estimation based on at least one pilot-symbol carried by the detected signal. In one embodiment, the detected signal comprises a frame including a plurality of PPM symbols having additional modulation and at least one pilot-symbol distributed among the PPM symbols having additional modulation. Recovering the polarization components of the detected signal may be based on pilot-assisted single-carrier frequency-division equalization (PA-SC-FDE).

In one embodiment, decoding the first non-zero portion of the plurality of bits carried by the symbol includes determining a first set of one or more slots of a plurality of slot positions for the symbol, the first set being the set of one or more slots having the greatest energy for the symbol, and correlating the first set to a corresponding bit pattern.

In another embodiment, the additional modulation carried on the at least one PPM pulse is correlated to a bit pattern for a signal constellation of a modulation scheme selected from the group consisting of polarization-division-multiplexed (PDM) modulation, phase-shift keying (PSK) modulation, polarization shift keying (PolSK) modulation, amplitude modulation (AM), quadrature-amplitude modulation (QAM) modulation, or a combination thereof. For example, a signal carried on each of the polarization components for the at least one PPM pulse may be correlated to a bit pattern for a signal constellation of a modulation scheme selected from the group consisting of quadrature phase-shift keying (QPSK), binary phase-shift keying (BPSK), m-ary phase-shift keying (mPSK) with m>4, n-point quadrature-amplitude modulation (nQAM) with n>4, and the like or some combination thereof in order to decode the second non-zero portion of the plurality of bits carried by the symbol.

In an example embodiment, an apparatus includes a dual-polarization coherent receiver front-end for detecting a signal including a pulse position modulation (PPM) symbol with at least one PPM pulse having additional modulation, a plurality of analog-to-digital converters (ADCs) for converting the detected signal into digital polarization components, and a processor for decoding a first non-zero portion of a plurality of bits carried by the PPM symbol based on at least one slot position of the digital polarization components and decoding a second non-zero portion of the plurality of bits carried by the symbol based on the additional modulation carried in the at least one slot position of the digital polarization components.

In one embodiment, the symbol includes pulses in the digital polarization components of a plurality of slot positions, and the processor is configured to decode the first non-zero portion based on the plurality of slot positions having pulses and to decode the second non-zero portion based on the polarization components of the pulses for the respective slot positions having the pulses. A symbol may have m slot positions where $2 \leq m \leq 16$. The detected signal may include a frame that includes a group of one or more pilot-sequences and a plurality of PPM symbols with at least one PPM pulse having additional modulation, with the processor configured to perform time synchronization, frequency synchronization, or channel estimation based on the one or more pilot-sequences.

In one embodiment, the detected signal comprises a frame including a plurality of PPM symbols with at least one PPM pulse having additional modulation and pilot-symbols distributed among the PPM symbols with at least one PPM pulse having additional modulation, and the processor is configured to perform phase estimation or frequency estimation based on the pilot-symbols. In another embodiment, the processor may be configured to perform pilot-assisted single-carrier frequency-division equalization (PA-SC-FDE).

In one embodiment, the processor is configured to decode the first non-zero portion of the plurality of bits carried by the PPM symbol with at least one PPM pulse having additional modulation by determining a first set of one or more slots having the greatest energy of a plurality of slot positions for the PPM symbol with at least one PPM pulse having additional modulation, and determining a bit pattern corresponding to the first set.

In another embodiment, the processor is configured to decode the second non-zero portion of the plurality of bits carried by the PPM symbol with at least one PPM pulse having additional modulation by correlating the additional modulation carried on the at least one PPM pulse having additional modulation in the at least one slot position to a bit pattern for a signal constellation of polarization-division-multiplexed (PDM) modulation, phase-shift keying (PSK) modulation, polarization shift keying (PolSK) modulation, amplitude modulation (AM), quadrature-amplitude modulation (QAM) modulation, or a combination thereof.

BRIEF DESCRIPTION OF THE DRAWINGS

Other aspects, features, and benefits of various embodiments will become more fully apparent, by way of example, from the following detailed description and the accompanying drawings, in which:

FIG. 2 illustrates the operation of a digital signal processor that can be used in the transmitter of the optical transmission system shown in FIG. 1 according to one embodiment;

FIGS. 3A-3C illustrate the operation of a digital signal processor 300 that can be used to implement digital signal processor 170 (FIG. 1) according to one embodiment;

FIG. 7 shows an example flow chart for a digital signal processor that can be used in the transmitter of the optical transmission system shown in FIG. 1 according to one embodiment.

DETAILED DESCRIPTION

Figure 1:
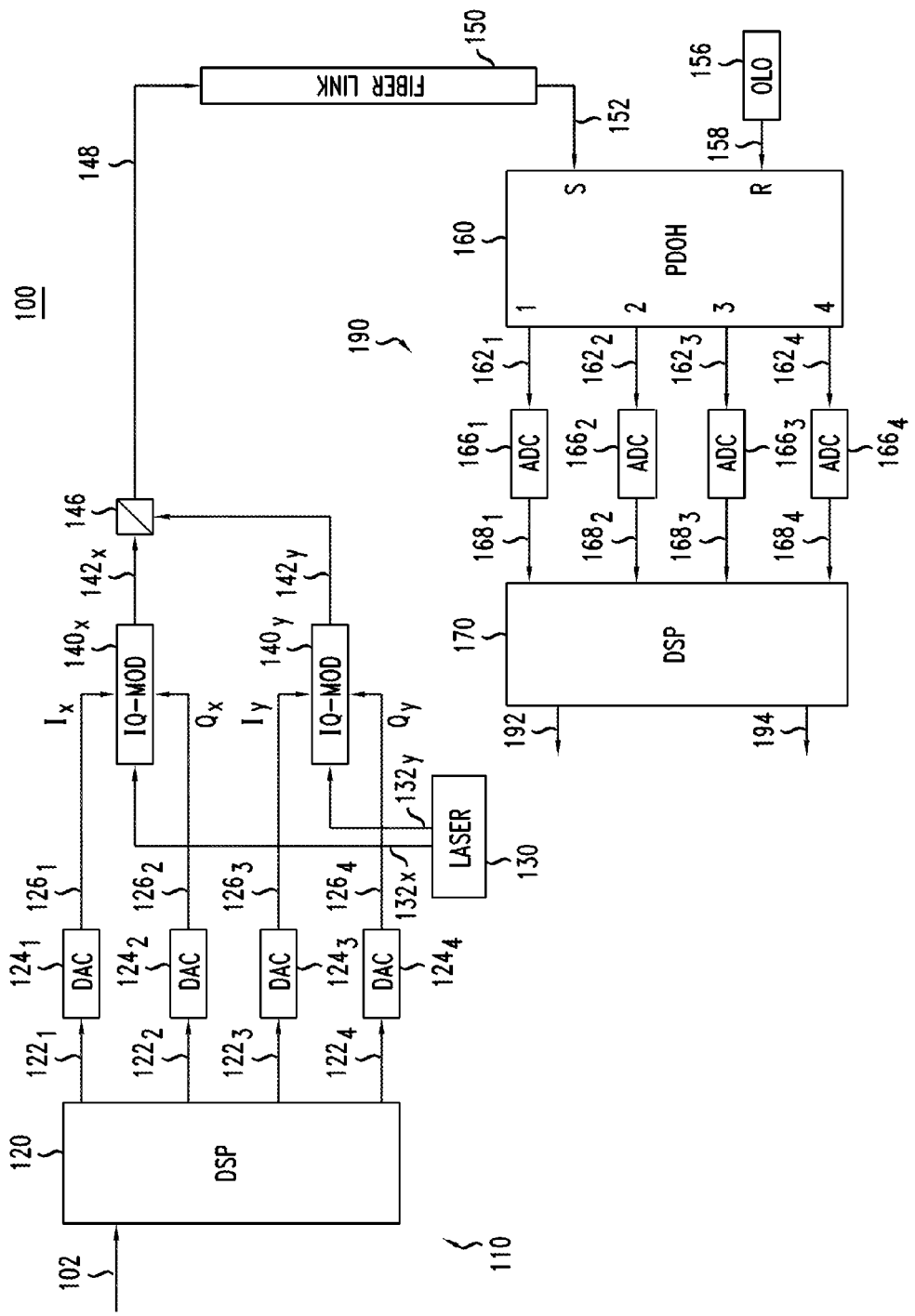
FIG. 1 shows a schematic diagram of an optical transmission system according to one embodiment.

FIG. 1 shows a block diagram of an optical transmission system 100 according to one embodiment. System 100 has an optical transmitter 110 and an optical receiver 190 connected via a transmission link 150. In one embodiment, transmission link 150 is a free-space optical link, e.g., a link connecting a satellite and a ground station (not explicitly shown in FIG. 1). In another embodiment, transmission link 150 is an amplified fiber link having one or more optical amplifiers (not explicitly shown in FIG. 1).

Transmitter 100 receives an input data stream 102 for transmission to receiver 190. A digital-signal processor 120 processes data stream 102 as further described below in reference to FIGS. 2, 3, 4 and 5 to generate digital signals $122_1$-$122_4$. Digital signals $122_1$-$122_4$ undergo a digital-to-analog conversion in digital-to-analog converters (DACs) $124_1$-$124_4$, respectively, to produce drive signals $126_1$-$126_4$. Drive signals $126_1$ and $126_2$ are in-phase (I) and quadrature-phase (Q) drive signals corresponding to the x-polarization signal component, e.g., Ix $126_1$ and Qx $126_2$. Drive signals $126_3$ and $126_4$ are similar in-phase and quadrature-phase drive signals corresponding to the y-polarization signal component, e.g., Iy $126_3$ and Qy $126_4$.

An optical IQ modulator $140_X$ uses drive signals $126_1$ and $126_2$ to modulate an optical-carrier signal $132_X$ generated by a laser source 130 and to produce a modulated signal $142_X$. An optical IQ modulator $140_Y$ similarly uses drive signals $126_3$ and $126_4$ to modulate an optical-carrier signal $132_Y$ generated by laser source 130 and to produce a modulated signal $142_Y$. In other embodiments, optical modulation may be provided by an optical modulation means that includes at least one of a polarization-diversity I/Q modulator, a dual polarization optical modulator, a phase modulator, an intensity modulator, a Mach Zehnder modulator, a current modulated laser. The optical modulation means may be an array of one or more of the above described modulator or lasers in order to modulate the optical carrier by the drive signals. Also, note that the drive signals can be further amplified by RF amplifiers before driving the optical IQ modulators. A polarization beam combiner (PBC) 146 combines modulated signals $142_X$ and $142_Y$ to produce an optical polarization-division-multiplexed (PDM) signal 148.

Transmission link 150 receives signal 148 from beam combiner 146 for transmission to receiver 190. The PDM signal 148 may be further amplified, for example by an Erbium Doped Fiber Amplifier (EDFA) (not explicitly shown in FIG. 1) prior to insertion on the transmission link 150. While propagating through transmission link 150, signal 148 is subjected to various transmission impediments, such as chromatic dispersion (CD), polarization rotation, and polarization-mode dispersion (PMD), and emerges at the receiver end of the transmission link as an optical signal 152.

Receiver 190 has an optical-to-electrical (O/E) converter 160 having (i) two input ports labeled S and R and (ii) four pairs of complementary output ports. Input port S receives optical signal 152. Input port R receives an optical reference signal 158 generated by an optical local oscillator (OLO) 156. Reference signal 158 has substantially the same optical-carrier frequency (wavelength) as signal 152. Reference signal 158 can be generated, e.g., using a tunable laser controlled by a wavelength-control loop (not explicitly shown in FIG. 1) that forces an output wavelength of the tunable laser to substantially track the carrier wavelength of signal 152. In various embodiments, optical local oscillator 156 may comprise a combination of tunable and/or non-tunable lasers, optical frequency converters, optical modulators, and optical filters appropriately connected to one another to enable the generation of reference signal 158.

O/E converter 160 mixes input signal 152 and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to two orthogonal polarization components of signal 152. For example, electrical signals $162_1$ and $162_2$ may be an analog in-phase signal and an analog quadrature-phase signal, respectively, corresponding to an x-polarization component of signal 152. Electrical signals $162_3$ and $162_4$ may similarly be an analog in-phase signal and an analog quadrature-phase signal, respectively, corresponding to a y-polarization component of signal 152.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication No. 2010/0158521, U.S. patent application Ser. No. 12/541,548 (filed on 08-14-2009), and International Patent Application No. PCT/US09/37746 (filed on 03-20-2009), all of which are incorporated herein by reference in their entirety.

Each of electrical signals $162_1$-$162_4$ generated by O/E converter 160, optionally amplified in a corresponding amplifier (not explicitly shown), is converted into digital form in a corresponding one of analog-to-digital converters (ADCs) $166_1$-$166_4$. Digital signals $168_1$-$168_4$ produced by ADCs $166_1$-$166_4$ are processed by a digital signal processor 170, e.g., as further described below in reference to FIGS. 3A-3C, to recover the data applied by data streams 102 and 104 to transmitter 110. The recovered data are outputted from receiver 190 via output signals 192 and 194, respectively.

FIG. 2 illustrates the operation of a digital signal processor 200 that can be used to implement digital signal processor 120 (FIG. 1) according to one embodiment. More specifically, FIG. 2 shows a block diagram of processor 200.

Processor 200 processes an input data stream 202 to generate digital output signals $222_I$ and $222_Q$. Input data stream 202 is applied to a coding module 204, where it is optionally interleaved and subjected to forward-error-correction (FEC) coding. A coded bit stream 206 produced by coding module 204 is applied to a constellation-mapping module 208, where it is converted into a corresponding sequence 210 of constellation symbols. The constellation used by constellation-mapping module 208 can be, for example, a PQ-mPPM (Polarization-division-multiplexed Quadrature-phase-shift-keyed m-ary-Pulse-Position-Modulation) constellation as further described below in reference to FIG. 7. In general, information bits are encoded through the positioning of pulse/s in a PPM format and through additional modulation of at least one of these pulses.

More particularly, a first non-zero portion of a plurality of bits for a symbol is encoded through at least one slot position corresponding to a pulse position modulation (PPM) format, and a second non-zero portion of the plurality of bits for the symbol is encoded on the at least one slot position through an additional modulation format.

Thus, other alternative constellation mapping may be performed. For example, the additional modulation format may be at least one of a polarization-division-multiplexed (PDM) format, a phase-shift keying (PSK) format, a polarization shift keying (PolSK) modulation format, an amplitude modulation (AM) format, a quadrature amplitude modulation (QAM) format, or a combination thereof. For example, the m-ary-Pulse-Position-Modulation may be multi-pulse M-PPM, with each pulse carrying the same or different modulation. In one embodiment, the m-ary-Pulse-Position-Modulation has m slot positions, m being an integer value with $2 \leq m \leq 16$. In other embodiments, m may be larger, with m being 32, 64, etc.

For example, the polarization-division-multiplexed phase-modulated modulation format for a pulse may be polarization-division-multiplexed quadrature phase-shift keying (PDM-QPSK), polarization-division-multiplexed binary phase-shift keying (PDM-BPSK), polarization-division-multiplexed m-ary phase-shift keying (PDM-mPSK) with m>4. In addition to the phase modulation, the amplitude of each PPM pulse may be modulated, e.g., through polarization-division-multiplexed n-point quadrature-amplitude modulation (PDM-nQAM) with n>4.

Symbol sequence 210 is applied to a framing module 212, where it is converted into a corresponding sequence 214 of data frames as further described below in reference to FIG. 4. When processor 200 is used to implement DSP 120 (FIG. 1), sequence 214 consists of two parallel subsequences, one corresponding to the X polarization and the other corresponding to the Y polarization. Frame sequence 214 produced by framing module 212 is then applied to a pulse-shaping module 218, where it is converted into output signals $222_I$ and $222_Q$. Thus, a signal including frame having a mapped symbol is modulated onto an optical carrier.

FIG. 7 shows an example flow chart 700 for a digital signal processor that can be used to implement digital signal processor 120 (FIG. 1). In particular, according to the example flow chart, frames including symbols encoded according to PQ-mPPM are generated. As mentioned above, other constellation mapping schemes that encode a first non-zero portion of a plurality of bits according to PPM and a second non-zero portion of a plurality of bits according to polarization-division multiplexed phase-modulated modulation are contemplated.

Referring back to FIG. 7, at 710, incoming bits are mapped for PQ-mPPM with $\log_2(m)+4$ bits per symbol. That is, incoming bits are grouped into sets of $\log_2(m)+4$ bits for encoding as for PQ-mPPM symbols.

At 720, the first $\log_2(m)$ bits of a symbol are encoded through m-PPM. At 730, the remaining four (4) bits of the symbol are encoded through PDM-QPSK on the PPM pulse. At 740, the above processing (710-730) is repeated to form a frame having PQ-mPPM symbols.

At 750, a set of pilot-symbols are distributed inside the frame for phase estimation (PE) purposes. At 760, pilot-sequences are inset at the beginning of the frame for synchronization and channel estimation (CE) purposes.

At 770, all of the above processing (710-760) is repeated in order to process the next frame.

Figure 4:
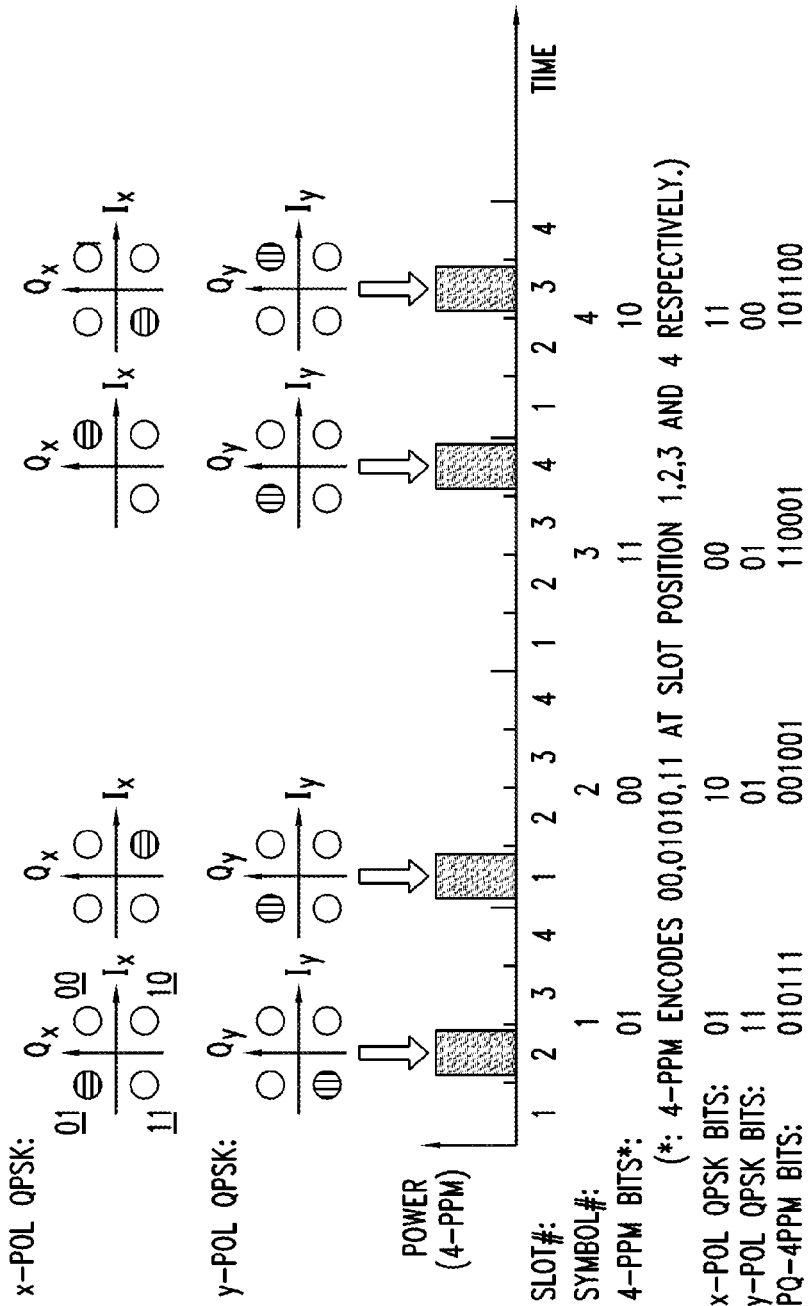
FIG. 4 illustrates the symbol structure of a PQ-4PPM symbol according to one embodiment.

FIG. 4 illustrates the symbol structure of a PQ-4PPM symbol according to one embodiment. An input data sequence (e.g., 010111001001110001101100 . . . ) is first grouped into sets of bits that are to be converted into PQ-4PPM symbols. Since incoming bits are grouped into sets of $\log_2(m)+4$ bits for encoding as for PQ-mPPM symbols, the input data sequence is grouped into pluralities of bits, each plurality containing six (6) (i.e., $=\log_2 4+4$) bits for encoding as PQ-4PPM symbols. Thus, the data steam is split into first, second, third, fourth pluralities of bits (e.g., 010111, 001001, 110001, 101100, . . . ) for symbol 1, symbol 2, symbol 3, symbol 4 etc., as shown in FIG. 4.

A first non-zero portion of the plurality of bits for each symbol, a $\log_2(m)$ portion of the bits for a symbol, are encoded according to m-PPM. Thus, as shown in FIG. 1, the first 2(=$\log_2 4$) bits of each symbol are encoded onto a 4-PPM pulse with its slot positions 1, 2, 3, and 4 representing 00, 01, 10, and 11, respectively. A second non-zero portion of the plurality of bits for each symbol is encoded according to a polarization-division-multiplexed phase-modulated modulation scheme for the pulse encoded at the slot position. For example, of the remaining bits of the plurality of bits for the symbol to be encoded (in this case 4 bits), the next two bits for each symbol may be encoded onto the x-polarization component of the pulse through QPSK and the last two bits for each symbol may be encoded onto the y-polarization component of the pulse through QPSK. Gray coding can be applied for QPSK so that phase states $\pi/4$, $3\pi/4$, $5\pi/4$, and $7\pi/4$ represent 00, 01, 11, and 10, respectively.

Thus as illustrated in FIG. 4, a first plurality of bits (010111) are to be encoded as symbol 1 of the shown PQ-4PPM symbols. A first non-zero portion (01) of the first plurality of bits is encoded according to PPM. Thus, a pulse is to be inserted in slot position #2. A second non-zero portion (0111) of the first plurality of bits (010111) is encoded according to a polarization division multiplexed phase modulated modulation format pulse at the so determined slot position. Since the pulse to be encoded is to be polarization division multiplexed, each polarization is able to carry a sub-portion of the second non-zero portion (0111) of the first plurality of bits (010111). For example, a first sub-portion (01) of the second non-zero portion (0111) of the first plurality of bits (010111) may be encoded on the x-polarization and a second sub-portion (11) of the second non-zero portion (0111) of the first plurality of bits (010111) may be encoded on the y-polarization. In this manner, a plurality of bits (010111) is encoded according to PPM and the phase and polarization states of the PPM pulse in a slot position.

Similarly, a second plurality of bits (001001) for encoding as symbol 2 of the PQ-4PPM symbols illustrated in FIG. 4 may be encoded by insertion of a PPM pulse in slot position #1 in order to represent a first non-zero portion (00) of the second plurality of bits (001001) with the x polarization of the pulse representing a first sub-portion (10) of the second non-zero portion (1001) of the second plurality of bits (001001) and the y polarization of the pulse representing a second sub-portion (01) of the second non-zero portion (1001) of the second plurality of bits (001001). Further, a third plurality of bits (110001) for encoding as symbol 3 of the PQ-4PPM symbols illustrated in FIG. 4 may be encoded by insertion of a PPM pulse in slot position #4 in order to represent a first non-zero portion (11) of the second plurality of bits (110001) with the x polarization of the pulse representing a first sub-portion (00) of the second non-zero portion (0001) of the second plurality of bits (110001) and the y polarization of the pulse representing a second sub-portion (01) of the second non-zero portion (0001) of the second plurality of bits (110001).

It should be noted that multi-pulse PPM can be applied to improve the throughput (or data rate) of the transmitter. In multi-pulse PPM, optical pulses are transmitted in multiple times slots in each PPM symbol. For 1-pulse m-PPM, the number of pulse patterns in each symbol is m, and $\log_2(m)$ bits can be transmitted per symbol. For multi-pulse m-PPM, the number of pulse patterns in each symbol is $m*(m-1)/2$, and $\log_2(m*(m-1)/2)$ bits can be transmitted per symbol. For m=16, 2-pulse 16-PPM carries $\log_2(16*15/2)$=6.9 bits per symbol, which is ~73% higher than that carried by 1-pulse 16-PPM. Note that the increase data rate is at the expense of reduced receiver sensitivity or reduced immunity to noise. Using more than 2 pulses per PPM symbol further increases the data rate carried by the PPM, but at further reduced receiver sensitivity. A more detailed description on multi-pulse PPM can be found in H. Sugiyama and K. Nosu, "MPPM: A method for improving the band-utilization efficiency in optical PPM," Journal of Lightwave Technology, vol. 7, pp. 465-472, (1989), which article in incorporated herein by reference in its entirety.

Figure 5:
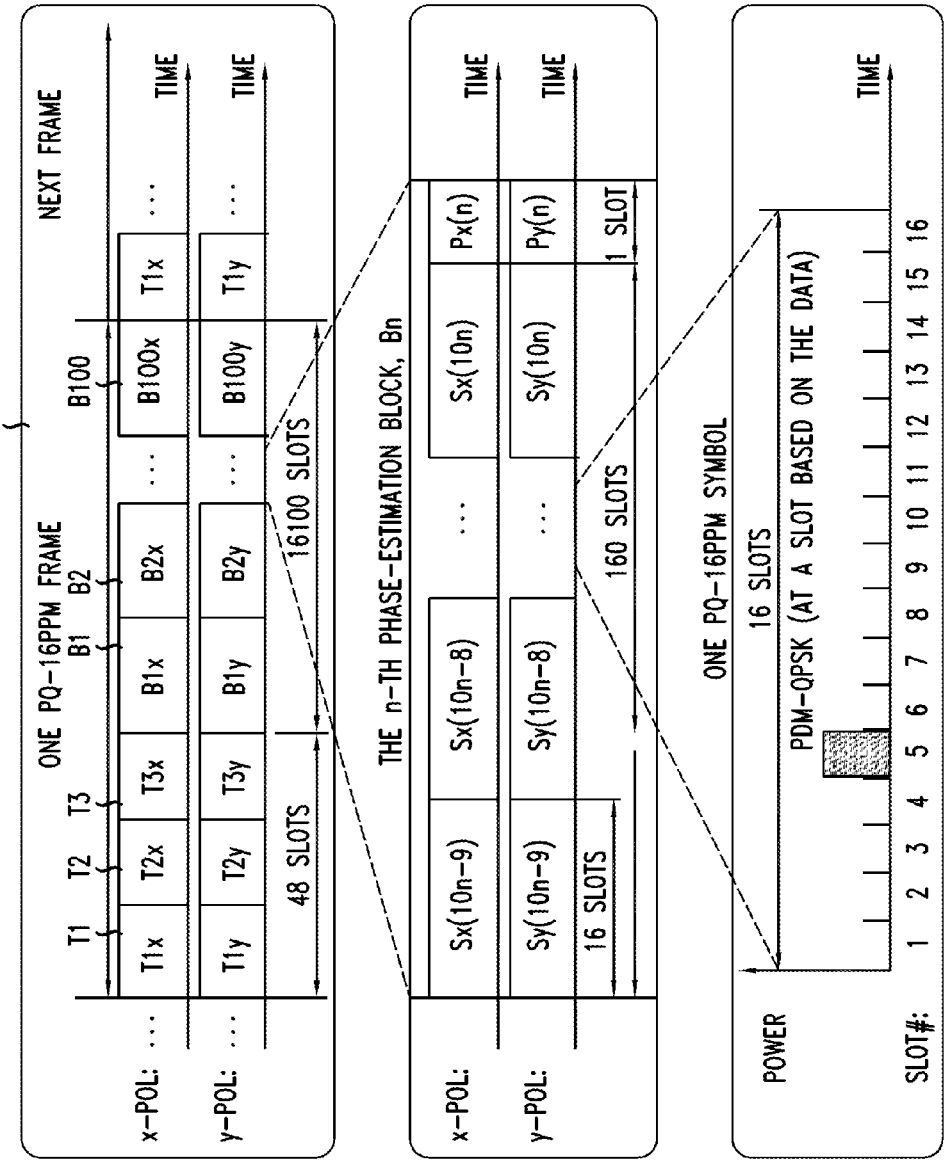
FIG. 5 illustrates the frame structure of a PQ-16PPM signal according to one embodiment.

FIG. 5 illustrates the frame structure of a PQ-16PPM frame according to one example embodiment. A representative frame 230 of frame sequence 214 comprises a plurality of pilot-symbol blocks (Tn) and a plurality of phase estimation blocks (Bn). For example, frame 230 has (i) pilot-symbol blocks T1, T2, T3 and (ii) payload-symbol blocks B1, B2, . . . B100. One important difference between a pilot-symbol block and a phase estimation block is that the former has a cyclic prefix (CP, also sometimes more generally replaced with a guard interval) while the latter does not. The use of cyclic prefixes in pilot-symbol blocks helps the synchronization and channel-estimation procedures performed at the receiver, e.g., receiver 190 (FIG. 1), to be robust in the presence of transmission impairments, such as chromatic dispersion (CD) and/or polarization mode dispersion (PMD). The nonuse of cyclic prefixes in phase estimation blocks helps to minimize the transmission overhead and thus achieve relatively high payload-data throughput. Channel-compensation procedures applied to the CP-free phase estimation blocks rely on the channel information obtained from pilot-symbol blocks and are described in more detail below in reference to FIGS. 3A-3C.

At the symbol level, one PQ-16PPM symbol will require 16 slots and have a PDM-QPSK pulse at one slot position. The slot position and the phase modulation of each polarization of the pulse modulated in the slot position are based on the data desired to be transmitted. An n-th phase estimation block (Bn) is created by packing ten (10) PQ-16PPM symbols (S=polarization division multiplexed phase-modulated modulation format) followed by an appended pilot symbol (P). The pilot symbol, occupying only one time slot, may be inserted to assist phase estimation (PE). The representative frame 230 is formed from three pilot-symbol blocks (T1, T2, T3) and one hundred phase estimation blocks (B1, B2, . . . B100).

The use of these pilots causes a negligible rate overhead of <1% (148/16000). The power penalty due to the pilots used for synchronization and CE is 0.2 dB (due to a power waste of ~48/16000=0.3%), and that for PE is 0.4 dB (due to a power waste of 1/160=0.625%). The use of these pilot symbols assists reliable signal reception at extremely low PPB.

Pilot sequences (T1, T2, and T3) are used to facilitate frame synchronization and channel estimation (CE). No guard interval (GI) is used for payload symbols in order to minimize overhead, although a GI is used for pilot sequences to ensure accurate CE. The overlap-and-add technique may be used during the channel compensation process. Polarization filtering (PF) and matched optical filtering, often used to achieve high sensitivity, are not used, thanks to the use of pilot-assisted single-carrier frequency-domain equalization (PA-SC-FDE) for polarization demultiplexing and equalization. PA-SC-FDE is preferred over blind equalization (without using pilots) because the convergence of a blind equalizer may be damaged when PPM locations are incorrectly identified.

Channel-compensation procedures applied to the CP-free phase estimation blocks (Bn in FIG. 5) rely on the channel information obtained from pilot-symbol blocks T2 and T3 and are described in more detail below in reference to FIGS. 3A-3C.

Pilot-symbol block T1 is designed to aid the receiver, e.g., receiver 190 (FIG. 1), in frequency estimation and frame synchronization. An exemplary pilot-symbol block T1 has two orthogonal polarization components, each comprising (i) cyclic prefix CP and (ii) symbol sequence E(n) having 2N symbols (i.e., n=1, 2, . . . 2N), in which the string that has the first N symbols is identical to the string that has the last N symbols. By having two identical halves, symbol sequence E(n) can readily be used for autocorrelation to find the starting point of the frame, and to find the frequency offset between carrier signals 132 and reference signal 158. Suitable methods that can be used to perform autocorrelation-based synchronization are described, e.g., in an article by T. M. Schmidt and D. C. Cox entitled "Robust Frequency and Timing Synchronization for OFDM," published in IEEE Transactions on Communications, Vol. 45, No. 12, December 1997, pp. 1613-1621, which article is incorporated herein by reference in its entirety.

In one embodiment, pilot-symbol block T1$x$ corresponding to the X-polarization (e.g., represented by modulated signal 142$_X$, FIG. 1) is the same as pilot-symbol block T1$y$ corresponding to the Y-polarization (e.g., represented by modulated signal 142$_Y$, FIG. 1). In an alternative embodiment, the X- and Y-polarizations for T1 may use different respective pilot-symbol blocks.

Figure 6:
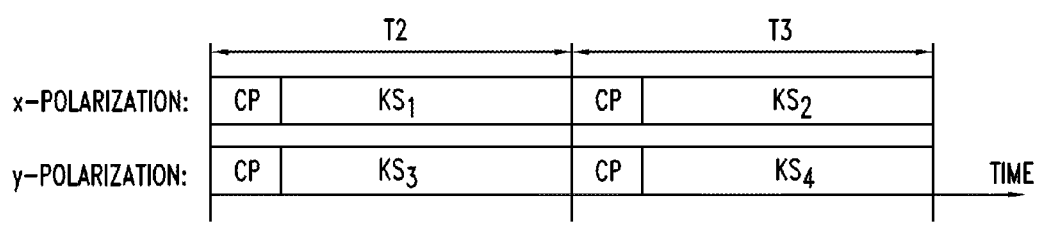
FIG. 6 illustrates an exemplary structure for pilot-symbol sequences for the frame structure of a PQ-16PPM signal according to one embodiment.

FIG. 6 shows an exemplary structure of pilot-symbol sequences for the frame structure for QP-16PPM. The illustrated pilot symbols sequences are those of pilot symbol sequences T2 and T3. Note that the pilot-symbol blocks T2$x$ and T3$x$ corresponding to the X-polarization may differ from the pilot-symbol blocks T2$y$ and T3$y$ corresponding to the Y-polarization. Pilot-symbol blocks T2 and T3 are designed to aid the receiver, e.g., receiver 190 (FIG. 1), in channel estimation and channel compensation.

Similar to pilot-symbol block T1, each pilot-symbol block T2 and T3 has a cyclic prefix (CP) prepended to a respective (known, predetermined) body sequence of symbols (KS). Cyclic prefix CP is constructed by taking several symbols from the end of body sequence KS, which makes each T2 and T3 pilot-data set a partially cyclic sequence. The length (L) of cyclic prefix CP is selected to be longer than the expected duration of the impulse response of the channel, e.g., fiber link 150, FIG. 1. This property of pilot-symbol blocks in frame sequence 214 enables the intended receiver to process the pilot-symbol blocks in the received signal (e.g., signal 152, FIG. 1) in a manner that mitigates inter-block interference imposed by the fiber link due to the effects of CD and PMD.

Body sequences KS corresponding to pilot-symbol blocks T2 and T3 have the same length in one embodiment. In a representative implementation, each body sequence KS is a special polyphase sequence of length 2N, wherein the amplitudes of all non-zero symbols in the time domain have different phases but the same amplitude, where N is a positive integer. One purpose of using this type of a sequence is to enable the receiver to accurately and uniformly probe the channel-response function, H, over the entire frequency range of interest. Channel-response function H may be a frequency-dependent 2×2 matrix whose elements are complex functions of frequency that describe the combined signal-transfer characteristics of the front end of the transmitter (e.g., transmitter 110, FIG. 1), the fiber link (e.g., fiber link 150, FIG. 1), and the front end of the receiver (e.g., receiver 190, FIG. 1).

Note that pilot-symbol blocks T2$x$ and T3$x$ corresponding to the X polarization are synchronous with pilot-symbol blocks T2$y$ and T3$y$, respectively, corresponding to the Y polarization. This characteristic of pilot-symbol blocks T2 and T3 is a manifestation of a more-general characteristic of data frame 230, according to which each symbol block corresponding to the X polarization is synchronous with a counterpart symbol block corresponding to the Y polarization. As such, pilot-symbol blocks T2$x$ and T3$x$ corresponding to the X polarization is synchronous with pilot-symbol block T2$y$ and T3$y$ corresponding to the Y polarization. Similarly, each phase estimation block Bn corresponding to the X polarization is synchronous with pilot-symbol block Bn corresponding to the Y polarization (see FIG. 5).

Referring back to FIG. 2, frame sequence 214 produced by framing module 212 is applied to a pulse-shaping module 218, where it is converted into output signals 222$_I$ and 222$_Q$. Pulse shaping implemented in pulse-shaping module 218 is a process of generating a digital waveform that, after being converted into a corresponding analog signal, can be applied to an optical modulator to modulate an optical-carrier signal, such as optical-carrier signal 132$_X$ or 132$_Y$ (FIG. 1), so that the resulting modulated optical signal is modulated with symbols corresponding to the various blocks of frame sequence 214. In one configuration, oversampling may be applied, e.g., by duplicating each signal sample one or more times for output signals 222$_I$ and 222$_Q$.

Figure 3C:
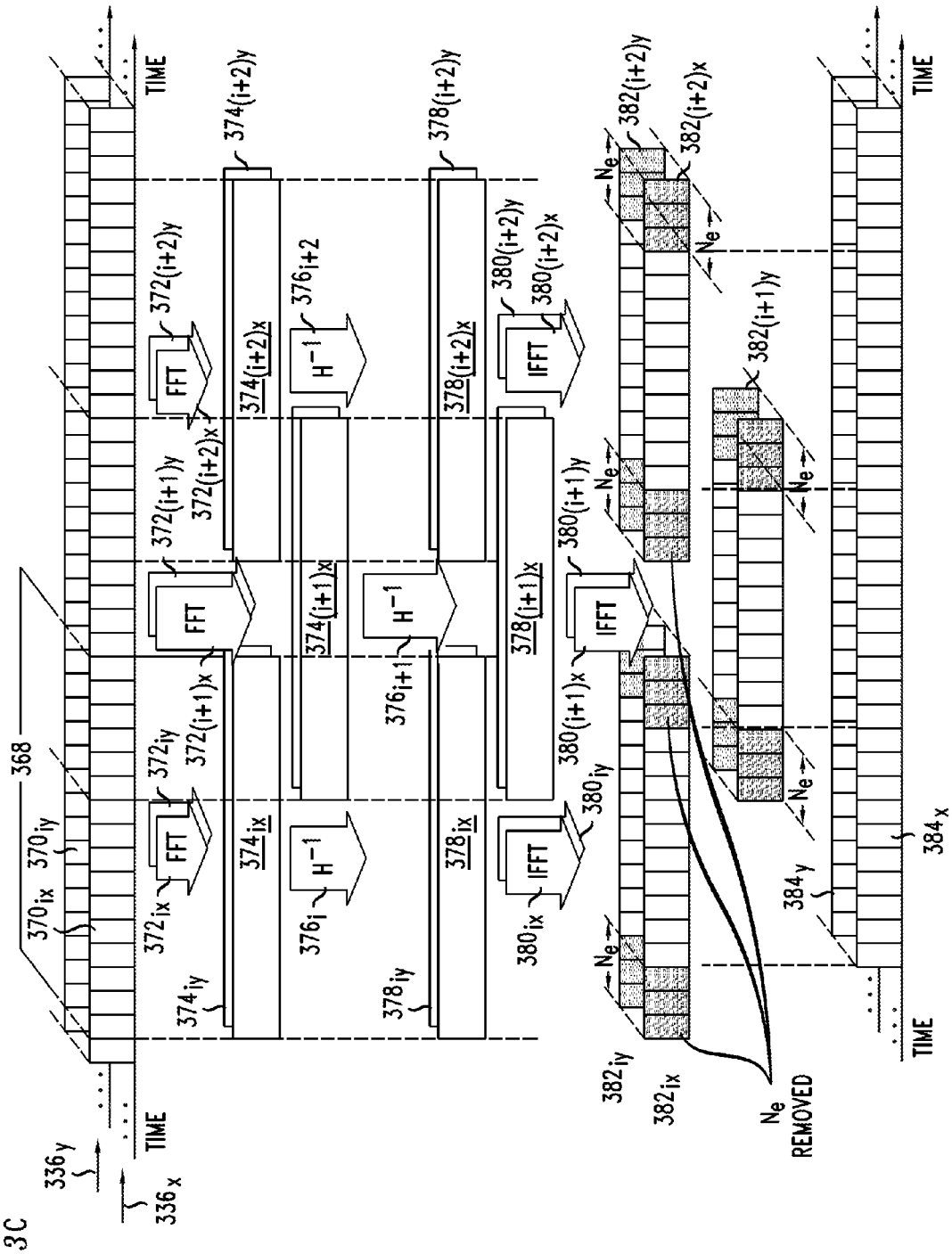

FIGS. 3A-3C illustrate the operation of a digital signal processor 300 that can be used to implement digital signal processor 170 (FIG. 1) according to one embodiment of the invention. More specifically, FIGS. 3A-3B show block diagrams of processor 300. FIG. 3C shows the processing implemented in an FDCCE (frequency-domain-channel-compensation/equalization) sub-module 352 of processor 300. When processor 300 is used as processor 170, input signals 302$_1$-302$_4$ correspond to signals 168$_1$-168$_4$ (FIG. 1), respectively, and output signals 332$_x$ and 332$_y$ correspond to output signals 192 and 194 (FIG. 1), respectively.

EDC (electronic dispersion compensation) modules 310 perform digital signal processing that mitigates the detrimental effects of chromatic dispersion imposed on input signal 152 by fiber link 150. In particular, EDC module 310$_x$ processes input signals 302$_1$-302$_2$ corresponding to the first principal polarization axis (e.g., the x axis) of PDOH 160 (FIG. 1). Similarly, EDC module 310$_y$ processes input signals 302$_3$-302$_4$ corresponding to the second principal polarization axis (e.g., the y axis) of PDOH 160. Note that the X and Y polarizations used at the transmitter may or may not be aligned with the principal polarization axes (i.e., the x and y axes) of PDOH 160. Various EDC modules that can be used to implement EDC module 310 are disclosed, e.g., in U.S. Pat. Nos. 7,570,889, 7,532,820, and 7,382,984, all of which are incorporated herein by reference in their entirety.

Dispersion-compensated signals 312$_1$-312$_4$ produced by EDC modules 310$_x$ and 310$_y$ are applied to a pilot-assisted frequency-division-equalization and decoding (PA-FDED) module 320 that processes these signals, e.g., as further described below in reference to FIGS. 3B-3C, to recover the original data streams applied to the transmitter for transmission, e.g., data streams 102 and 104 of FIG. 1. More specifically, PA-FDED module 320 generates data stream 332$_x$ that carries the data corresponding to the first independently modulated component of signal 152 (e.g., component 142$_X$, FIG. 1), and similarly generates data stream 332$_y$ that carries the data corresponding to the second independently modulated component of signal 152 (e.g., component 142$_Y$, FIG. 1).

FIG. 3B shows a block diagram of PA-FDED module 320 according to one embodiment. PA-FDED module 320 has a synchronization sub-module 340 that receives, as its input, dispersion-compensated signals 312$_1$-312$_4$. Synchronization sub-module 340 relies on the above-described properties of pilot-symbol block T1 (T1x and T1y) to determine the start of each frame 230 (also see FIG. 5). In one configuration, synchronization sub-module 340 calculates an autocorrelation function defined by Eq. (1):

$$P(n) = \sum_{k=1}^{N} [r_x(n+k-1) * r_x(n+k+N-1) + r_y(n+k-1) * r_y(n+k+N-1)] \quad (1)$$

where the "*" symbol denotes a complex conjugate; $r_x(n)$ is a complex value whose real part is a signal sample provided by signal 312$_1$ and whose imaginary part is a corresponding signal sample provided by signal 312$_2$; and $r_y(n)$ is a complex value whose real part is a signal sample provided by signal 312$_3$ and whose imaginary part is a corresponding signal sample provided by signal 312$_4$. Since symbol sequence E(n) of pilot-symbol block T1 (T1x and T1y) has two identical portions of length N, the absolute value of function P(n) has a pronounced maximum that is temporally aligned with the first symbol of symbol sequence E(n) and, as such, can be used to determine the temporal position of the corresponding frame 230.

An FE (frequency-estimation/compensation) sub-module 344 that is located downstream from synchronization sub-module 340 performs electronic estimation and compensation of a mismatch between the carrier-frequency of input signal 152 and the frequency of reference signal 158 (see FIG. 1). In one embodiment, FE sub-module 344 determines the phase of $P(n_{max})$, where $n_{max}$ is the time slot corresponding to the maximum of the absolute value of function P(n) (see Eq. (1)) determined by synchronization sub-module 340. FE sub-module 344 then uses the phase of $P(n_{max})$ to calculate the frequency offset between signals 152 and 158. If the frequency offset is zero, then $P(n_{max})$ is real and its phase is zero. If the frequency offset is not zero, then $P(n_{max})$ is complex and its phase is directly related to the frequency offset and the duration of pilot-symbol block T1. Because the frequency offset may change over time, FE sub-module 344 performs the frequency-offset calculation for each received frame 230.

After the frequency offset is determined, FE sub-module 344 performs frequency-mismatch compensation by applying to each signal sample a phase shift equal to the frequency offset multiplied by 2π and the time elapsed between the start of the frame determined by synchronization sub-module 340 and the signal sample. Various FE modules that can be adapted to function as FE sub-module 344 are disclosed, e.g., in U.S. Pat. No. 7,747,177 and U.S. Patent Application Publication No. 2008/0152361, both of which are incorporated herein by reference in their entirety.

A CE (channel-estimation) sub-module 348 uses signal samples corresponding to pilot-symbol blocks T2 (T2x and T2y) and T3 (T3x and T3y) to determine the channel-response function, H, which may be expressed in the frequency domain as a 2×2 Jones matrix given by Eq. (2):

$$H(f) = \begin{pmatrix} a(f) & b(f) \\ c(f) & d(f) \end{pmatrix} \quad (2)$$

More specifically, using the a priori knowledge of body sequences KS$_1$, KS$_2$, KS$_3$, and KS$_4$, CE sub-module 348 constructs channel-response function H so that the application of that channel-response function to these body sequences transforms them into the received signal samples corresponding to these known body sequences. Note that an individual channel-response function H can be calculated by CE sub-module 348 for each frame 230, which enables the receiver to appropriately track time-dependent channels.

FIG. 3C also shows exemplary processing implemented in FDCCE (frequency-domain channel-compensation/equalization) sub-module 352. More specifically, the shown processing handles signal samples corresponding to the payload of a single transmitted frame (e.g., payload-symbol blocks Sx in a phase estimation block Bn in frame 230 having data corresponding to both the X and Y polarizations, see FIG. 5) and, as such, uses the channel-response function H determined by channel-estimation sub-module 348. For processing each new frame, FDCCE sub-module 352 uses a corresponding new channel-response function H determined by and received from CE sub-module 348.

As already indicated above, the symbols of phase estimation blocks Bn in frame 230 do not have cyclic prefixes. As a result, inter-block interference (IBI) occurs at the receiver. To mitigate the adverse effects of IBI, FDCCE sub-module 352 may perform, as further described below and with respect to FIG. 3C, overlap FDCCE processing with a sliding window 368 that has 2N consecutive signal samples from a sequence 366 of frequency-corrected signal samples corresponding to the payload of a received frame. Sequence 366 consists of two parallel sub-sequences, i.e., a sequence 366$_x$ that corresponds to signals 312$_1$-312$_2$ and a sequence 366$_y$ that corresponds to signals 312$_3$-312$_4$ (also see FIGS. 3A-3B). Note that signal samples in sequence 366$_x$ have contributions both from the symbols carried by signal 142$_X$ and from the symbols carried by signal 142$_Y$ (FIG. 1). Signal samples in sequence 366$_y$ similarly have contributions both from the symbols carried by signal 142$_X$ and from the symbols carried by signal 142$_Y$ (FIG. 1).

For an i-th position of sliding window 368, FDCCE sub-module 352 applies: (i) a fast Fourier transform (FFT) 372$_{ix}$ to a block 370$_{ix}$ of 2N signal samples located inside the window and belonging to sequence 366$_x$ and (ii) an FFT 372$_{iy}$ to a block 370$_{iy}$ of 2N signal samples located inside the window and belonging to sequence 366$_y$. FFT operation 372$_{ix}$ converts block 370$_{ix}$ into a corresponding block 374$_{ix}$ of 2N frequency components. FFT operation 372$_{iy}$ similarly converts block 370$_{iy}$ into a corresponding block 374$_{iy}$ of 2N frequency components.

Blocks 374$_{ix}$ and 374$_{iy}$ are subjected to a frequency-domain-equalization (FDE) procedure 376$_i$, which converts these blocks into blocks 378$_{ix}$ and 378$_{iy}$. Similar to blocks 374$_i$, each of blocks 378$_{ix}$ and 378$_{iy}$ has 2N frequency components. FDE procedure 376$_i$ includes the application of inverse channel-response function H$^{-1}$, which is derived by FDCCE sub-module 352 from channel-response function H (see Eq. (2)) determined by channel-estimation sub-module 348. Since channel-response function H generally has a non-diagonal form (i.e., b(f)≠0 and c(f)≠0), FDE procedure 376$_i$ mixes frequency components from blocks 374$_{ix}$ and 374$_{iy}$ to produce the corresponding frequency components for blocks 378$_{ix}$ and 378$_{iy}$. Note that FFT operations 372$_i$ do not have this feature because (i) block $374_{ix}$ is produced by operating solely on block $370_{ix}$ and without using any signal samples from block $370_{iy}$ and (ii) block $374_{iy}$ is produced by operating solely on block $370_{iy}$ and without using any signal samples from block $370_{ix}$.

Blocks $378_{ix}$ and $378_{iy}$ are subjected to inverse FFT (IFFT) operations $380_{ix}$ and $380_{iy}$, respectively. IFFT operation $380_{ix}$ converts block $378_{ix}$ into 2N time-domain signal samples, which form block $382_{ix}$. IFFT operation $380_{iy}$ similarly converts block $378_{iy}$ into 2N time-domain signal samples, which form block $382_{iy}$. Similar to FFT operations $372_i$, IFFT operations $380_i$ do not mix the x and y blocks.

Block $382_{ix}$ is truncated to remove $N_e$ signal samples from the beginning of the block and $N_e$ signal samples from the end of the block, where $N_e$ is a predetermined number chosen so that the signal samples affected by IBI are being truncated out. The remaining portion of block $382_{ix}$ having $2N-2N_e$ signal samples is used to form sequence $384_x$ of equalized signal samples that is output from FDCCE sub-module 352 to the downstream sub-modules of PA-FDED module 320. Block $382_{iy}$ is similarly truncated to remove $N_e$ signal samples from the beginning of the block and $N_e$ signal samples from the end of the block. The remaining portion of block $382_{iy}$ having $2N-2N_e$ signal samples is used to form sequence $384_y$ of equalized signal samples that is also output from FDCCE sub-module 352 to the downstream sub-modules of PA-FDED module 320.

Sliding window 368 is shifted down sequences $366_x$ and $366_y$ by $2N-2N_e$ signal samples to the (i+1)-th position, and the processing that is described above for the i-th is repeated for the (i+1)-th position as indicated in FIG. 6C. The shifts of sliding window 368 by $2N-2N_e$ signal samples and the corresponding processing are repeated until all of the payload symbols of the corresponding frame 230 for both X- and Y-polarizations have been recovered.

In one configuration, $N_e=L/2$ and $2N-2N_e=N_{DS}$, where L is the length of cyclic prefix CP in pilot-symbol blocks T2 and T3 (FIG. 2C), and $N_{DS}$ is the length of a symbol block (S) in frame 230 (FIG. 5). In this configuration, the processing performed at the i-th position of sliding window 368 recovers all symbols of payload-symbol block $S_i$ in frame 230 (see FIG. 5). To recover the symbols of the first payload symbol block in the frame ($DS_1$), sliding window 368 is positioned so that the first $N_e$ signal samples inside the window belong to pilot-symbol block T3 of the same frame. To recover the symbols of the last payload-symbol block in the frame ($DS_n$), sliding window 368 is positioned so that the last $N_e$ signal samples inside the window belong to pilot-symbol block T1 of the next frame.

Note that, as illustrated above, CE sub-module 348 can perform channel-estimation and FDCCE sub-module 352 can perform block-overlap processing for polarization-division-multiplexed signals in a manner that enables FDCCE sub-module 352 to apply channel-response-compensation and polarization-demultiplexing procedures in a combined, intertwined, non-serial manner that advantageously saves processing time and/or power.

Referring back to FIG. 6B, equalized sequences $384_x$ and $384_y$ produced by FDCCE sub-module 352 are applied to a phase-estimation/phase-correction (PE/PC) sub-module 356. PE/PC sub-module 356 performs digital processing that corrects or compensates for slowly changing phase shifts between input signal 152 and reference signal 158 (FIG. 1), and then estimates the phase of the signal samples in equalized sequences $384_x$ and $384_y$ for constellation demapping and decoding. Various processing modules that can be used to implement PE/PC sub-module 356 are disclosed, e.g., in above-cited U.S. Patent Application Publication No. 2008/0152361 and also in U.S. Pat. No. 7,688,918 and U.S. Patent Application Publication No. 2008/0075472, both of which are incorporated herein by reference in their entirety.

A demapping sub-module 360 uses the phase estimates obtained by PE/PC sub-module 356 and the constellation map to convert equalized sequences $384_x$ and $384_y$ into the corresponding sequences of constellation symbols. Demapping sub-module 360 then decodes each constellation symbol to convert it into the corresponding set of bits, thereby generating bit streams $362_x$ and $362_y$, corresponding to equalized sequences $384_x$ and $384_y$, respectively. In the absence of errors, bit stream $362_x$ is a copy of bit stream $206_X$, and bit stream $362_y$ is a copy of bit stream $206_Y$ (also see FIG. 2A). When decoding errors are present, a bit stream 362 may differ somewhat from the corresponding bit stream 206.

An FEC (forward error correction) sub-module 364 performs error correction in bit streams $362_x$ and $362_y$ using data redundancies that were introduced into the corresponding bit streams 206 by coding modules 204 (FIG. 2A). The resulting error-corrected bit streams are output via signals $332_x$ and $332_y$. Many FEC methods suitable for use in FEC sub-module 364 are known in the art. Both hard-decision and soft-decision decoding may be implemented in various embodiments of FEC sub-module 364. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

Figure 8:
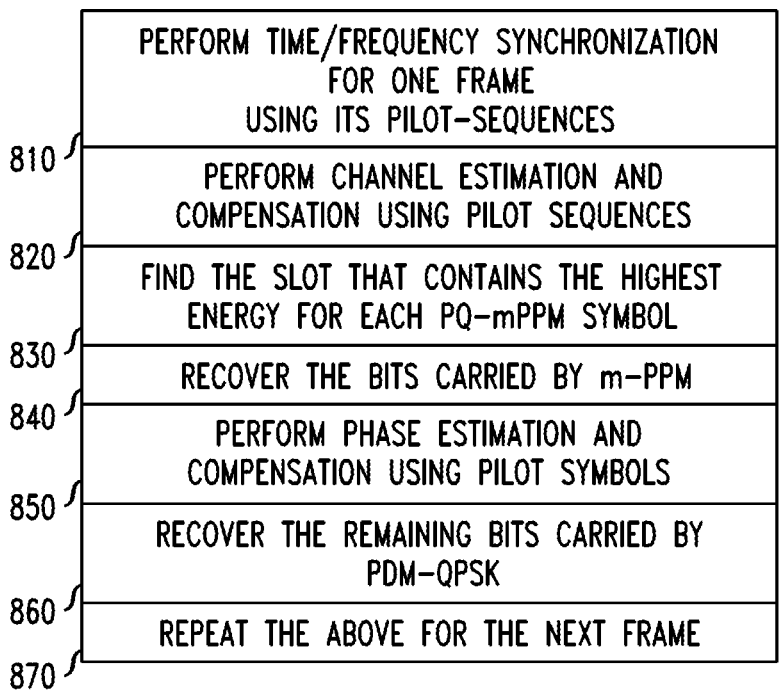
FIG. 8 shows the flow chart of a digital signal processor that can be used in the receiver of the optical transmission system shown in FIG. 1 according to one embodiment.

FIG. 8 shows an example flow chart 800 for a digital signal processor 300 that can be used to implement digital signal processor 170 (FIG. 1) according to one example embodiment. In particular, according to the example flow chart, frames including symbols encode according to PQ-mPPM are recovered from a detected signal. More particularly, polarization components of the detected PQ-mPPM signal are digitally recovering by decoding a first non-zero portion of a plurality of bits carried by a symbol based on slot position of at least one PPM pulse in the polarization components, and decoding a second non-zero portion of the plurality of bits carried by the symbol based on phase-modulation carried by the at least one PPM pulse in the polarization components. As noted above in connection with the transmitter, other polarization-division multiplexed phase-modulating modulation formats, in addition to other single or multi-pulse m-pulse position modulation schemes may be utilized according to various embodiments of the invention.

This receiving process may be generalized as detecting a signal including a symbol with at least one pulse position modulation (PPM) pulse having additional modulation through a dual-polarization coherent receiver front-end and recovering polarization components of the detected signal including a symbol with at least one pulse position modulation (PPM) pulse having additional modulation. In that embodiment, recovering includes decoding a first non-zero portion of a plurality of bits carried by a symbol based on slot position of the at least one PPM pulse having additional modulation in the polarization components, and decoding a second non-zero portion of the plurality of bits carried by the symbol based on the additional modulation carried by the at least one PPM pulse in the polarization components.

Referring back to FIG. 8, at 810 time/frequency synchronization are performed a one frame by using its pilot-sequences. At 820, channel estimation and compensation are performed by using pilot sequences.

At 830, for each PQ-mPPM symbol, the slot or plurality of slots that contains the highest energy is determined. At 840, the bits carried by m-PPM encoding are recovered based on the slot or plurality of slots that contain the highest energy.

At 850, phase estimation and compensation are performed using pilot symbols. At 860, the remaining bits carried by PDM-QPSK are recovered based on the pulse/s in the at least one slot that contain a pulse. At 860, all the above processing (810-850) is in order to process the next frame. At 870, all of the above processing (810-860) is repeated in order to process the next frame.

While this invention has been described with reference to illustrative embodiments, this description is not intended to be construed in a limiting sense. Although various embodiments of the invention have been described in reference to polarization-division-multiplexed (PDM) signals, the invention is not so limited and may be similarly applied to processing non-PDM signals. Various modifications of the described embodiments, as well as other embodiments of the invention, which are apparent to persons skilled in the art to which the invention pertains are deemed to lie within the principle and scope of the invention as expressed in the following claims.

The term "single-carrier" is a term of art that is used in this specification to contrast embodiments of the optical transmission system disclosed herein with an optical OFDM transmission system. This term should not be interpreted to imply that embodiments of the invention are not compatible with wavelength-division multiplexing (WDM) technology. One of ordinary skill in the art will appreciate that certain signal processing techniques disclosed herein may be applied to each of different carrier frequencies (wavelengths) of a WDM multiplex.

Embodiments may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical communication method, comprising:
  detecting a signal including a symbol with at least one pulse position modulation (PPM) pulse having additional modulation through a dual-polarization coherent receiver front-end; and
  recovering polarization components of the detected signal, wherein recovering comprises:
    decoding a first non-zero portion of a plurality of bits carried by a symbol based on slot position of the at least one PPM pulse having additional modulation in the polarization components; and decoding a second non-zero portion of the plurality of bits carried by the symbol based on the additional modulation carried by the at least one PPM pulse in the polarization components.

2. The method of claim 1, wherein the symbol includes a plurality of PPM pulses having additional modulation in a corresponding plurality of slot positions, and further comprising decoding the first non-zero portion based on the plurality slot positions with PPM pulses having additional modulation, and the second non-zero portion based on the additional modulation of the PPM pulses having additional modulation in the slot positions of the polarization components.

3. The method of claim 1, wherein the symbol has m slot positions where $2 \leq m \leq 16$.

4. The method of claim 1, wherein recovering the polarization components is assisted by one or more pilot-sequences.

5. The method of claim 1, wherein recovering further comprises:

performing time synchronization, frequency synchronization, or channel estimation based on one or more pilot-sequences carried by the detected signal.

6. The method of claim 1, wherein the detected signal comprises:

a frame including
a group of one or more pilot-sequences, and
a plurality of symbols with at least one PPM pulse having additional modulation.

7. The method of claim 1, wherein recovering the polarization components of the detected signal having additional modulation is assisted by at least one pilot-symbol.

8. The method of claim 1, wherein recovering further comprises:

performing phase estimation or frequency estimation based on at least one pilot-symbol carried by the detected signal.

9. The method of claim 1, wherein the detected signal comprises a frame including a plurality of PPM symbols having additional modulation and at least one pilot-symbol distributed among the PPM symbols having additional modulation.

10. The method of claim 1, wherein recovering the polarization components of the detected signal is based on pilot-assisted single-carrier frequency-division equalization (PA-SC-FDE).

11. The method of claim 1, wherein decoding the first non-zero portion of the plurality of bits carried by the symbol comprises:

determining a first set of one or more slots of a plurality of slot positions for the symbol, the first set being the set of one or more slots having the greatest energy for the symbol;

correlating the first set to a corresponding bit pattern.

12. The method of claim 1, wherein decoding the second non-zero portion of the plurality of bits carried by the symbol comprises:

correlating the additional modulation carried on the at least one PPM pulse to a bit pattern for a signal constellation of a modulation scheme selected from the group consisting of polarization-division-multiplexed (PDM) modulation, phase-shift keying (PSK) modulation, polarization shift keying (PolSK) modulation, amplitude modulation (AM), quadrature-amplitude modulation (QAM) modulation, or a combination thereof.

13. An apparatus comprising:

a dual-polarization coherent receiver front-end for detecting a signal including a pulse position modulation (PPM) symbol with at least one PPM pulse having additional modulation;

a plurality of analog-to-digital converters (ADCs) for converting the detected signal into digital polarization components;

a processor for decoding a first non-zero portion of a plurality of bits carried by the PPM symbol based on at least one slot position of the digital polarization components and decoding a second non-zero portion of the plurality of bits carried by the symbol based on the additional modulation carried in the at least one slot position of the digital polarization components.

14. The apparatus of claim 13, wherein the PPM symbol includes PPM pulses having additional modulation in the digital polarization components of a plurality of slot positions, and wherein the processor is configured to decode the first non-zero portion based on the plurality of slot positions having the PPM pulses and to decode the second non-zero portion based on the additional modulation of the PPM pulses for the respective slot positions.

15. The apparatus of claim 13, wherein the symbol has m slot positions where $2 \leq m \leq 16$.

16. The apparatus of claim 13, wherein the detected signal comprises a frame including a group of one or more pilot-sequences and a plurality of PPM symbols with at least one PPM pulse having additional modulation, and wherein the processor is configured to perform time synchronization, frequency synchronization, or channel estimation based on the one or more pilot-sequences.

17. The apparatus of claim 13, wherein the detected signal comprises a frame including a plurality of PPM symbols with at least one PPM pulse having additional modulation and pilot-symbols distributed among the PPM symbols with at least one PPM pulse having additional modulation, and wherein the processor is configured to perform phase estimation or frequency estimation based on the pilot-symbols.

18. The apparatus of claim 13, wherein the processor is configured to perform pilot-assisted single-carrier frequency-division equalization (PA-SC-FDE).

19. The apparatus of claim 13, wherein the processor is configured to decode the first non-zero portion of the plurality of bits carried by the PPM symbol with at least one PPM pulse having additional modulation by:

determining a first set of one or more slots having the greatest energy of a plurality of slot positions for the PPM symbol with at least one PPM pulse having additional modulation; and determining a bit pattern corresponding to the first set.

20. The apparatus of claim 13, wherein the processor is configured to decode the second non-zero portion of the plurality of bits carried by the PPM symbol with at least one PPM pulse having additional modulation by:

correlating the additional modulation carried on the at least one PPM pulse having additional modulation in the at least one slot position to a bit pattern for a signal constellation of polarization-division-multiplexed (PDM) modulation, phase-shift keying (PSK) modulation, polarization shift keying (PolSK) modulation, amplitude modulation (AM), quadrature-amplitude modulation (QAM) modulation, or a combination thereof.

* * * * *